US012801443B2

(12) United States Patent
Li et al.

(10) Patent No.: US 12,801,443 B2
(45) Date of Patent: Nov. 17, 2026

(54) METHODS AND APPARATUSES FOR DATA PROCESSING FOR REDUCING MEMORY CONSUMPTION, STORAGE MEDIA, AND ELECTRONIC DEVICES

(71) Applicant: ZHEJIANG LAB, Hangzhou City (CN)

(72) Inventors: Yong Li, Hangzhou City (CN); Laiping Zhao, Hangzhou City (CN); Jie Li, Hangzhou City (CN); Wen Cheng, Hangzhou City (CN); Guang Chen, Hangzhou City (CN); Lingfang Zeng, Hangzhou City (CN)

(73) Assignee: ZHEJIANG LAB, Hangzhou City (CN)

( * ) Notice: Subject to any disclaimer, the term of this patent is extended or adjusted under 35 U.S.C. 154(b) by 448 days.

(21) Appl. No.: 18/569,295

(22) PCT Filed: Oct. 11, 2023

(86) PCT No.: PCT/CN2023/124084

§ 371 (c)(1),
(2) Date: Dec. 12, 2023

(87) PCT Pub. No.: WO2024/187737

PCT Pub. Date: Sep. 19, 2024

(65) Prior Publication Data

US 2025/0086022 A1 Mar. 13, 2025

(30) Foreign Application Priority Data

Mar. 10, 2023 (CN) ......................... 202310247250.4

(51) Int. Cl.
*G06F 9/50* (2006.01)
*G06F 9/48* (2006.01)

(52) U.S. Cl.
CPC .......... *G06F 9/5044* (2013.01); *G06F 9/4881* (2013.01); *G06F 9/5016* (2013.01)

(58) Field of Classification Search
CPC .... G06F 9/5044; G06F 9/4881; G06F 9/5016; G06F 9/50; G06F 9/48; Y02D 10/00
See application file for complete search history.

(56) References Cited

U.S. PATENT DOCUMENTS 8,984,526 B2 * 3/2015 Garg ..................... G06F 9/5083 718/1
2016/0132355 A1 * 5/2016 Campbell ............... G06F 9/445 718/103

(Continued)

FOREIGN PATENT DOCUMENTS

CN 102646058 A * 2/2011 ........... G06F 9/5016
CN 104092794 A 10/2014

(Continued)

OTHER PUBLICATIONS

State Intellectual Property Office of the People's Republic of China, Office Action and Search Report Issued in Application No. 2023102472504, Apr. 23, 2023, 8 pages.

(Continued)

*Primary Examiner* — Pierre Vital
*Assistant Examiner* — Zuheir A Mheir
(74) *Attorney, Agent, or Firm* — Carroll, Hoette & Butscher, LLC; Christopher R. Carroll

(57) ABSTRACT

Disclosed are methods and apparatuses for data processing, storage media, and electronic devices. The method includes: obtaining each piece of to-be-processed data, determining whether a set amount of the to-be-processed data is capable to be processed under a current processing process by a data processing model, in response to determining that the set amount of the to-be-processed data cannot be processed, obtaining data processing periods of the data processing (Continued)

model under multiple configuration combinations; for a data processing period of each configuration combinations, determining an amount of data that is capable to be processed by the data processing model within the data processing period, as a target data amount; according to the target data amount, selecting a target configuration combination from the configuration combinations, and creating a processing process under the target configuration combination; and according to the processing process, performing data processing on the to-be-processed data.

20 Claims, 6 Drawing Sheets

(56) References Cited

U.S. PATENT DOCUMENTS

2019/0227842 A1 7/2019 Qiu et al.
2024/0070450 A1* 2/2024 Ju .............................. G06F 7/57
2024/0168830 A1* 5/2024 Edwards ............. G06F 9/30047

FOREIGN PATENT DOCUMENTS

CN 109471731 A 3/2019
CN 110134516 A 8/2019
CN 110297711 A * 10/2019 ............. G06F 16/21
CN 111274015 A * 6/2020 ........... G06F 9/4881
CN 112231054 A 1/2021
CN 114764372 A * 1/2021 ............ G06F 9/5011
CN 113254186 A 8/2021
CN 113722077 A 11/2021
CN 113760561 A 12/2021
CN 114579303 A 6/2022
CN 115344207 A 11/2022
CN 115358404 A 11/2022
CN 115391609 A 11/2022
CN 115544555 A * 12/2022 ........... G06F 21/602
CN 115562859 A 1/2023
CN 115964181 A 4/2023

OTHER PUBLICATIONS

Tang Jiufei et al. "Research on stream program task scheduling and cache optimization for X86 multi-core processor". Journal of University of Science and Technology of China, Mar. 15, 2016, 8 pages.
Christo Rautenbach et al."Computing efficiency of XBeach hydro-and wave dynamics on Graphics Processing Units (GPUs)", Environmental Modelling & Software vol. 157, Nov. 30, 2022, 6 pages.
ISA State Intellectual Property Office of the People's Republic of China, International Search Report Issued in Application No. PCT/CN2023/124084, Jan. 15, 2024, WIPO, 6 pages. (Submitted with Machine Translation).
ISA State Intellectual Property Office of the People's Republic of China, Written Opinion of the International Searching Authority Issued in Application No. PCT/CN2023/124084, Jan. 15, 2024, WIPO, 9 pages. (Submitted with Machine Translation).

* cited by examiner

METHODS AND APPARATUSES FOR DATA PROCESSING FOR REDUCING MEMORY CONSUMPTION, STORAGE MEDIA, AND ELECTRONIC DEVICES

CROSS REFERENCE TO RELATED APPLICATIONS

This application is a US National Phase of a PCT Application No. PCT/CN2023/124084 filed on Oct. 11, 2023, which claims priority to Chinese Patent Application No. 2023102472504 filed on Mar. 10, 2023, the entire contents of which are incorporated herein by reference in their entireties.

TECHNICAL FIELD

The present disclosure relates to the field of computer technology, in particular to methods and apparatuses for data processing, storage media, and electronic devices.

BACKGROUND

In recent years, due to widespread application of machine learning, especially deep learning algorithms, scenarios such as the Internet of Things and mobile application backend heavily rely on inference services of machine learning and deep learning models. The serverless computing model is supported and rapidly promoted by major cloud service providers due to its ease of use, low cost, and automatic scaling. More and more work starts to build inference services based on serverless platforms. Since current serverless inference systems are usually memory-intensive, the memory consumption problem has gradually become a bottleneck in the development of this technology.

In the process of data processing, for each piece of to-be-processed data, the server will generate a corresponding processing request. For each processing request, the server will call a processing process to process it. In order to reduce the processing process's occupation of server memory, processing requests are usually batched, thereby combining multiple requests into a larger request to share one processing process. However, batch processing of requests introduces additional request queuing time. Especially when the server configuration is low, batch processing of requests is often impossible. This method will increase the delay of the data processing process.

Therefore, how to reduce the occupation of server memory resources without increasing the delay of data processing is an urgent problem to be solved.

SUMMARY

The present disclosure provides methods and apparatuses for data processing, storage media, and electronic devices to partially solve the aforementioned problems existing in the prior art.

The present disclosure adopts following technical solutions.

The present disclosure provides a method for data processing, including:

- obtaining to-be-processed data;
- determining whether a set amount of the to-be-processed data is capable to be processed under a current processing process by a data processing model, in response to determining that the set amount of the to-be-processed data cannot be processed under the current processing process by the data processing model, obtaining data processing periods of the data processing model under multiple configuration combinations;
- for a data processing period of each of the multiple configuration combinations, determining an amount of data that is capable to be processed by the data processing model within the data processing period, as a target data amount;
- by taking the data processing model to be capable to process the set amount of the to-be-processed data as a target, according to the target data amount for a data processing period of each of the multiple configuration combinations, selecting a target configuration combination from the multiple configuration combinations, and creating a processing process under the target configuration combination; and
- according to the processing process under the target configuration combination, performing data processing on the to-be-processed data.

In some embodiments, the configuration combination includes at least one of a quantity of central processing units, a batch processing size, data parallelism, or storage locations of a parameter tensor for an operator, where the storage locations of the parameter tensor include a local memory node and a remote memory node.

In some embodiments, before obtaining the data processing periods of the data processing model under the multiple configuration combinations, the method further includes:

- inputting the multiple configuration combinations into a preset performance estimating model, and for each of the multiple configuration combinations, determining a data processing period of each operator included in the data processing model under the configuration combination through the performance estimating model; and
- according to the data processing period of each operator under the configuration combination, determining a corresponding data processing period of the data processing model under the configuration combination.

In some embodiments, the method further includes:

- in a case where the data processing model includes at least two parallel linear networks, determining a corresponding data processing period for each of the at least two linear networks under the configuration combination; and
- taking a maximum value of the data processing periods for the at least two linear networks under the configuration combination as the data processing period of the data processing model under the configuration combination.

In some embodiments, by taking the data processing model to be capable to process the set amount of the to-be-processed data as the target, according to the target data amount for the data processing period of each of the multiple configuration combinations, selecting the target configuration combination from the multiple configuration combinations, and creating the processing process under the target configuration combination includes:

- according to the target data amount for the data processing period of each of the multiple configuration combinations, selecting the target configuration combination from the multiple configuration combinations, and creating the processing process under the target configuration combination; and
- determining whether the data processing model is capable to process the set amount of the to-be-processed data after creating the processing process under the target configuration combination;

in response to determining that the data processing model is unable to process the set amount of the to-be-processed data, determining a new target configuration combination from other configuration combinations except the target configuration combination according to the target data amount for the data processing period of each of the multiple configuration combinations, and creating a new processing process under the new target configuration combination, until the data processing model is capable to process the set amount of the to-be-processed data.

In some embodiments, by taking the data processing model to be capable to process the set amount of the to-be-processed data as the target, according to the target data amount for the data processing period of each of the multiple configuration combinations, selecting the target configuration combination from the multiple configuration combinations, and creating the processing process under the target configuration combination includes:

for each target configuration combination of the multiple configuration combinations, setting storage locations of parameter tensors in the target configuration combination as remote memory nodes; and according to an actual target data amount of the data processing model, deleting an excess processing process.

In some embodiments, by taking the data processing model to be capable to process the set amount of the to-be-processed data as the target, according to the target data amount for the data processing period of each of the multiple configuration combinations, selecting the target configuration combination from the multiple configuration combinations includes:

for each of the multiple configuration combinations, in response to determining that parameter tensors in the configuration combination are stored in the local memory node, determining the data processing period for the data processing model under the configuration combination as a first processing period;

for each of the parameter tensors in the configuration combination, determining the data processing period for the data processing model when the parameter tensor is stored in the remote memory node, as a second processing period;

according to the first processing period and the second processing period, determining an increased data processing period after changing the parameter tensor from being stored in the local memory node to being stored in the remote memory node, as a latency rise time;

according to a memory size occupied by the parameter tensor and the latency rise time for the parameter tensor, determining a greedy coefficient for the parameter tensor; and determining a parameter tensor with a highest greedy coefficient as a target parameter tensor that allows remote access;

determining the data processing period for the data processing model when the target parameter tensor is stored in the remote memory node; and determining whether the data processing period is greater than a preset service quality constraint period;

in response to determining that the data processing period is less than or equal to the preset service quality constraint period, determining the configuration combination where the target parameter tensor is stored in the remote memory node as the target configuration combination.

In some embodiments, the latency rise time for the parameter tensor is negatively correlated with the greedy coefficient for the parameter tensor, and the memory size occupied by the parameter tensor is positively correlated with the greedy coefficient for the parameter tensor.

In some embodiments, the method further includes:

in response to determining that the data processing period is less than the service quality constraint period when the target parameter tensor is stored in the remote memory node, determining a next target parameter tensor and the data processing period for the data processing model when the next target parameter tensor is stored in the remote memory node, until the data processing period is greater than the service quality constraint period.

In some embodiments, according to the processing process under the target configuration combination, performing data processing on the to-be-processed data includes:

according to multiple target configuration combinations respectively corresponding to multiple processing processes, determining a target data amount corresponding to each of the multiple processing processes; and according to the target data amount corresponding to each of the multiple processing processes, allocating the to-be-processed data required to be processed by the multiple processing processes.

In some embodiments, according to the processing process under the target configuration combination, performing data processing on the to-be-processed data includes:

determining parameter tensors that the data processing model needs to load;

for each of the parameter tensors, determining whether the parameter tensor is stored in a local memory node;

in response to determining that the parameter tensor is stored in the local memory node, mapping a parameter tensor memory in the local memory node through memory mapping and loading the parameter tensor; in response to determining that the parameter tensor is not stored in the local memory node, determining whether the parameter tensor is allowed to be stored in a remote memory node under a current configuration combination;

in a case where the parameter tensor is allowed to be stored in the remote memory node under the current configuration combination, in response to determining that the parameter tensor is stored in the remote memory node, mapping a parameter tensor memory in the remote memory node through memory mapping and loading the parameter tensor;

according to the processing process under the target configuration combination and the loaded parameter tensor, performing data processing on the to-be-processed data.

In some embodiments, the method further includes:

in response to determining that the parameter tensor is not allowed to be stored in the remote memory node under the current configuration combination, creating a memory region in a local memory and adding the parameter tensor to a local memory node corresponding to the memory region.

In some embodiments, the method further includes:

in response to determining that the parameter tensor is allowed to be stored in the remote memory node under the current configuration combination and the parameter tensor is not stored in the remote memory node, creating a memory region in a local memory and adding the parameter tensor to a local memory node corresponding to the memory region.

In some embodiments, for each of the parameter tensors, determining whether the parameter tensor is stored in the local memory node includes:

for each of the parameter tensors, determining a hash value for the parameter tensor; and by taking the hash value as authentication information for the parameter tensor, accessing the local memory node and determining whether the parameter tensor is stored in the local memory node.

In some embodiments, according to the processing process under the target configuration combination, performing data processing on the to-be-processed data includes:

according to a processing process included in the data processing model, determining mapping times for each of the parameter tensors;

according to the mapping times for each of the parameter tensors, determining a reference count for each of the parameter tensors; and for each of the parameter tensors, in response to determining that the reference count for the parameter tensor is reset during data processing of the to-be-processed data, reclaiming a tensor memory for the parameter tensor.

In some embodiments, creating the processing process under the target configuration combination includes:

for each processing process, according to a memory size and a CPU quantity for the processing process, filtering out server nodes that do not meet requirements of the configuration combination, and determining remaining server nodes as candidate server nodes;

for each of the candidate server nodes, determining a maximum memory that is allowed to be shared on the candidate server node; and according to the maximum memory that is allowed to be shared on each of the candidate server nodes, selecting a designated server node as a target server node, and scheduling the processing process to the target server node.

In some embodiments, the method is applied to a serverless platform, and the local memory node and the remote memory node are memory nodes on a non-uniform-memory-access memory.

The present disclosure provides an apparatus for data processing, including:

an obtaining module, configured to obtain to-be-processed data;

a calling module, configured to determine whether a set amount of the to-be-processed data is capable to be processed under a current processing process by a data processing model, in response to determining that the set amount of the to-be-processed data cannot be processed under the current processing process by the data processing model, obtain data processing periods of the data processing model under multiple configuration combinations;

a determining module, configured to, for a data processing period of each of the multiple configuration combinations, determine an amount of data that is capable to be processed by the data processing model within the data processing period, as a target data amount;

a creating module, configured to, by taking the data processing model to be capable to process the set amount of the to-be-processed data as a target, according to the target data amount for a data processing period of each of the multiple configuration combinations, select a target configuration combination from the multiple configuration combinations, and create a processing process under the target configuration combination; and a processing module, configured to, according to the processing process under the target configuration combination, perform data processing on the to-be-processed data.

The present disclosure provides a computer-readable storage medium, where the storage medium stores a computer program, and the computer program when executed by a processor achieves the above method for data processing.

The present disclosure provides an electronic device including a memory, a processor and a computer program stored on the memory and runnable on the processor, where the processor, when the program is executed by the processor, achieves the above method for data processing.

At least one of the above technical solutions adopted in the present application can achieve the following beneficial effects.

In the method for data processing provided in the present disclosure, the server obtains each piece of to-be-processed data, determines whether a set amount of the to-be-processed data is capable to be processed under a current processing process by a data processing model, in response to determining that the set amount of the to-be-processed data cannot be processed under the current processing process by the data processing model, obtains data processing periods of the data processing model under multiple configuration combinations; for a data processing period of each of the multiple configuration combinations, determines an amount of data that is capable to be processed by the data processing model within the data processing period, as a target data amount; by taking the data processing model to be capable to process the set amount of the to-be-processed data as a target, according to the target data amount for a data processing period of each of the multiple configuration combinations, selects a target configuration combination from the multiple configuration combinations, and creates a processing process under the target configuration combination; and according to the processing process under the target configuration combination, performs data processing on the to-be-processed data.

From the above methods, it can be seen that this solution can determine the target data amounts of the data processing model under different configuration combinations when it is determined that the data processing model cannot process all the to-be-processed data at one time under the current processing process, and then select the corresponding target configuration combination to expand a new processing process, which ensures that with expanding fewer processing processes, the data processing model can complete the preset amount of to-be-processed data at one time, and reduce the use of server memory resources without increasing the delay time of the data processing process.

BRIEF DESCRIPTION OF DRAWINGS

The accompanying drawings illustrated herein are used to provide further understanding of the present disclosure and form a part of the present disclosure. The exemplary embodiments and descriptions of the present disclosure are used to explain the present disclosure, and do not constitute an improper limitation of the present disclosure.

DETAILED DESCRIPTION

In order present the purposes, technical solutions and advantages of the present disclosure clearer, the technical solutions of the present disclosure will be clearly and completely described below in conjunction with specific embodiments and corresponding drawings of the present disclosure. The described embodiments are only a part of the embodiments of the present disclosure, and not all of them. Other embodiments achieved by those skilled in the art according to the embodiments in the present disclosure without paying creative work shall all fall within the scope of protection of the present disclosure.

The technical solutions provided in the embodiments of the present disclosure are described in detail below in conjunction with the accompanying drawings.

Figure 1:
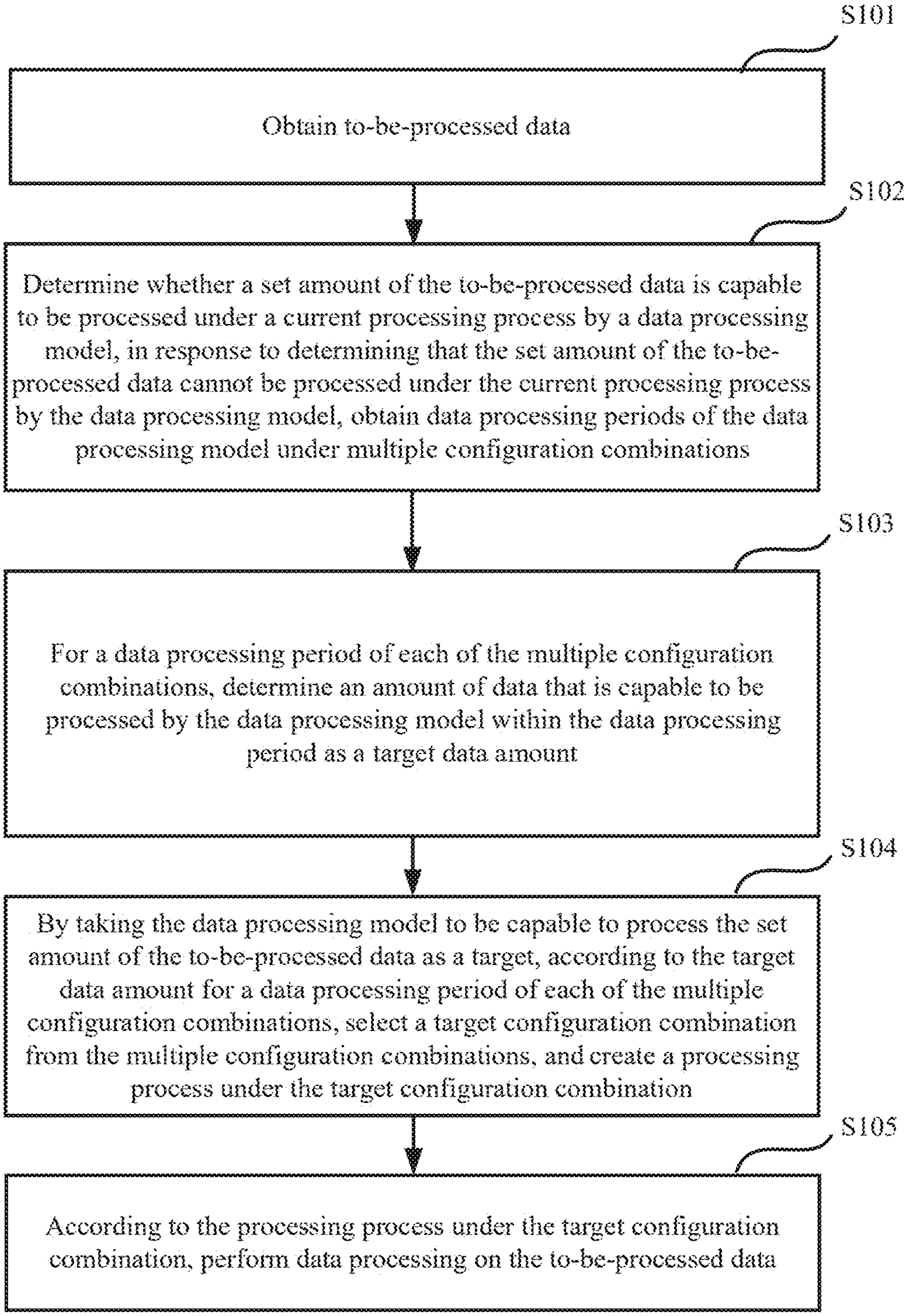
FIG. 1 is a flowchart of a method for data processing provided in the present disclosure.

FIG. 1 is a flowchart of a method for data processing provided in the present disclosure. The method includes steps S101-S105.

In step S101, to-be-processed data is obtained.

Usually, when deploying inference services using existing serverless computing platforms such as AWS Lambda, it is difficult to deploy large models. For example, AWS Lambda limits the memory usage of functions to ≤10 GB, while the recent MT-NLG language model even requires 2 TB of memory to load its 530 billion parameters. Besides, it can cause significant memory waste. For example, AWS Lambda's one-to-one mapping strategy of requests and functions results in a large amount of duplication of runtime, library and model tensors in memory between function instances (processing processes). On the one hand, since serverless inference functions have the characteristics of low trigger frequency, short execution time, and long cache time in memory, serverless inference functions usually occupy less system CPU (Central Processing Unit) time and occupy a large amount of system memory, which makes optimizing the memory consumption of serverless inference systems particularly important.

On the other hand, currently, data centers use servers based on Non-Uniform Memory Access (NUMA) architecture on a large scale. Under the NUMA architecture, each CPU socket has a corresponding local memory node, and the speed of accessing local memory nodes is much faster than the speed of accessing remote memory nodes. For the data processing tasks of machine learning and deep learning models, a large number of model parameters need to be accessed during the execution process. In this case, accessing remote memory nodes will cause a significant increase in inference delay (the performance loss caused by accessing NUMA memory nodes is shown in FIG. 2).

Figure 2:
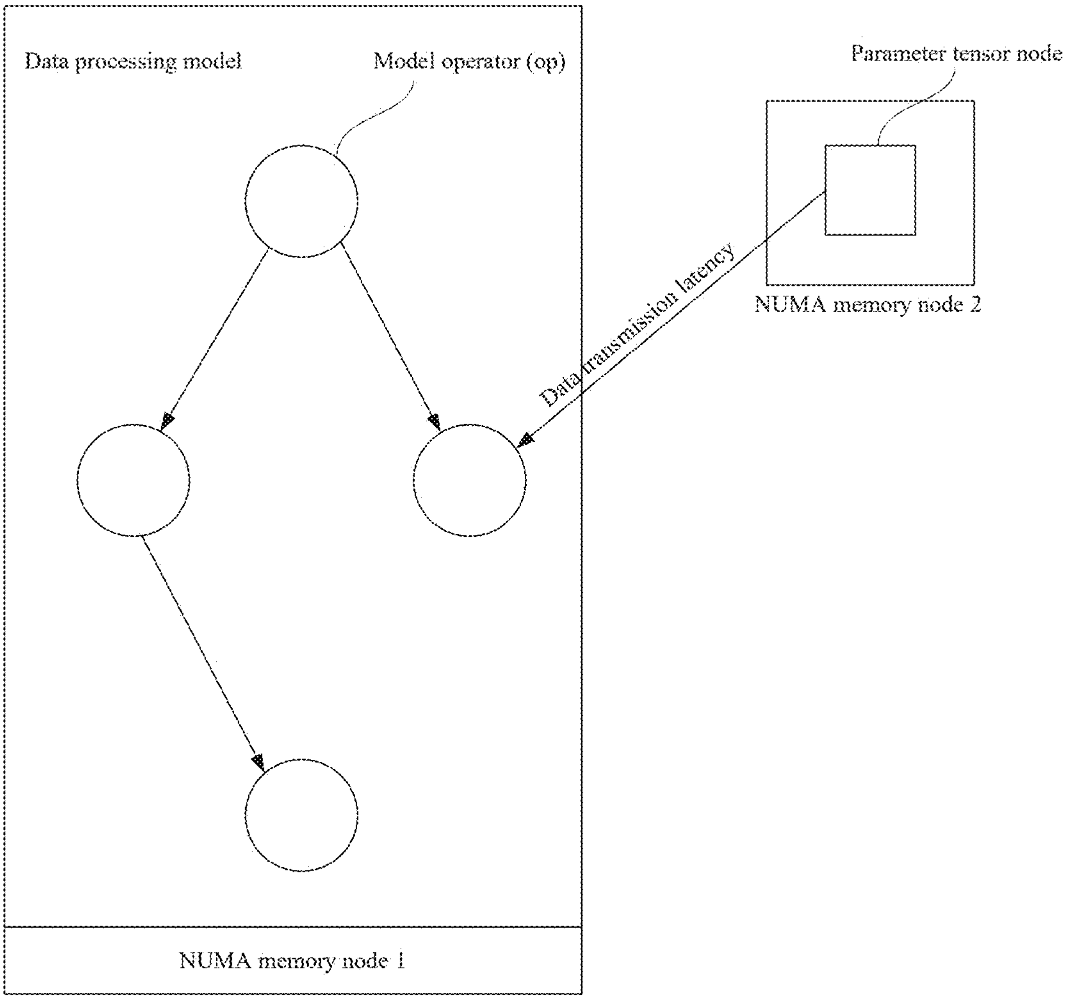
FIG. 2 is a schematic diagram of a performance loss generated by accessing a NUMA memory node provided in the present disclosure.

FIG. 2 is a schematic diagram of a performance loss generated by accessing a NUMA memory node provided in the present disclosure.

NUMA memory node 1 shown in FIG. 2 is a local memory node, and NUMA memory node 2 shown in FIG. 2 is a remote memory node. During the data processing process of the data processing model, the performance loss (latency) generated by accessing the memory node will increase due to accessing the remote memory node. The data processing model includes a deep learning model. Operators can include basic computational units that constitute the data processing model. For example, different activation functions can serve as different operators, different convolution operations can serve as different operators, and operations such as sum, product, and remainder can also serve as operators. A data processing model can be composed of multiple operators.

Therefore, in order to reduce inference delay, under the NUMA architecture, containers for deploying data processing models are usually bound to an individual CPU socket, and it is restricted to access only local memory nodes, which further exacerbates the overall memory consumption of the system.

In order to reduce memory usage, related technologies have proposed a method of runtime sharing to reduce the runtime redundancy of processing processes, which involves executing multiple requests simultaneously in the same processing process through batch processing of requests or increasing the parallelism of processing processes, thereby reducing the number of processing processes in the system and reducing the consumption of server memory.

However, there are significant redundancy issues in tensor memory in serverless inference systems. Tensor redundancy is usually caused by the horizontal expansion of multiple processing processes in the same data processing model. This is because multiple processing processes in the same data processing model share the same model parameters, and due to the widespread pre-training model or transfer learning techniques, there is also a large amount of tensor redundancy between a large number of different data processing models. In order to optimize memory consumption, it is necessary to eliminate the redundancy of tensors in memory.

However, in the NUMA architecture, reducing runtime and tensor redundancy of processing processes is difficult because the distribution of parameter tensors in the data processing model on NUMA memory nodes can greatly affect the inference delay of the model.

For example, if all parameter tensor redundancy in machine memory is eliminated and only one copy is retained on one of the NUMA memory nodes, then all inference containers deployed on other CPU sockets will experience a significant increase in inference delay due to accessing remote memory nodes. Therefore, it is necessary to design the system reasonably to balance the performance loss caused by accessing NUMA memory nodes while reducing memory consumption, and ultimately, the memory consumed in the system is minimized while ensuring user delay requirements.

Based on this, the present disclosure provides a method for data processing, where a server needs to obtain the to-be-processed data.

In the present disclosure, the server can be a server in a serverless platform, and each time the server receives a piece of to-be-processed data, the server generates a corresponding processing request, and at the same time, processes the to-be-processed data through a data processing model under the current processing process.

In a serverless system, for each processing request, the server generates a corresponding function instance, each function instance corresponds to a processing process, and is deployed in a corresponding container of the server.

It should be noted that the serverless system mentioned in the present disclosure is a cloud native development model that allows developers to focus on building and running applications without the need to manage servers. There are still servers in a serverless system, but there is no need to consider servers in application development. Cloud providers are responsible for routine tasks such as providing, maintaining, and expanding server infrastructure. Developers can simply package code into containers for deployment. After deployment, the serverless system can respond to user's data processing requests.

In step S102, it is determined whether a set amount of the to-be-processed data is capable to be processed under a current processing process by a data processing model, in response to determining that the set amount of the to-be-processed data cannot be processed under the current processing process by the data processing model, data processing periods of the data processing model under multiple configuration combinations are obtained.

During the process of data processing by the server through the data processing model, when the load increases, the server may not be able to process the set amount of to-be-processed data and it is needed to queue up for waiting, which increases the overall time for data processing. Therefore, when the server determines that the data processing model cannot process the set amount of to-be-processed data at one time under the current processing process (the server is currently unable to execute the set amount of processing requests), the server can determine processing requests that cannot be executed, that is, determine the remaining to-be-processed data that cannot be processed.

In the present disclosure, the above set amount can be all to-be-processed data or all processing requests sent by the user currently, or it can be set according to the actual situation, which is not limited in the present disclosure.

During this process, the server can pre-deploy a corresponding performance estimating module and through the performance estimating module, determine the corresponding data processing period of the data processing model under each configuration combination.

The server can obtain the data processing periods of the data processing model under different configuration combinations through the performance estimating module. For example, since the data processing model is composed of multiple computing units, each computing unit is an operator (OP). For each operator, its execution period is affected by the number of allocated central processing units (CPUs), batch size, data parallelism and storage location of the called parameter tensor, therefore, the above configuration combination can include: the number of central processing units (CPUs), batch size, data parallelism, and the storage location of the corresponding parameter tensor for each operator. The batch size mentioned above can be the request batch size, which is used to represent the amount of data that is allowed to be processed by the current process. The configuration combination can further include the memory capacity allocated to each operator, which is not limited in the present disclosure.

It should be noted that for OP that requires an input parameter tensor (such as a convolutional operator that requires an input parameter tensor for a convolutional kernel), execution period of the OP is affected by the storage location corresponding to the input parameter tensor. In the present disclosure, the storage location can be the distributed location of the parameter tensor on a NUMA memory node, including a local memory node and a remote memory node of NUMA. In practical applications, any non-local NUMA node that requires the operator to perform cross-node access can serve as a remote memory node.

The performance estimating module can use the method of profiling to record the actual processing performances for each operator under all configuration combinations. Since the processing performance for the operator corresponds to the data processing period for the operator, the processing performance for the operator can also be expressed by data processing period. For the processing performance of each operator, the processing time corresponding to that operator can be expressed as $t_{op}=f(c,b,p,L)$, where c indicates the number of allocated CPUs, b indicates the batch size, p indicates the data parallelism, L indicates a set of Boolean variables representing whether each input parameter tensor of the op is stored in the remote memory node of NUMA, and f represents the mapping relationship between these configurations and processing time. Actually, $f$ is obtained through profiling.

The performance estimating module can input different configuration combinations into the pre-trained performance estimating model, to determine the corresponding data processing period of each operator in the data processing model under the configuration combination through the performance estimating model. The performance estimating model can be obtained through profiling, or it can be predicted using a machine learning model according to the profiling results.

During this process, for the data processing model, the server will continuously modify its configuration <c,b,p> through the performance estimating module, and for each OP containing input parameter tensors, the storage location <L> of an input parameter tensor is continuously modified. For each configuration combination, multiple inferences are performed, and an average processing period of each OP is recorded. Finally, the processing periods of the OP under all configuration combinations are obtained, thus obtaining the performance function $f$ of the OP. The output of performance profiling is performance models $f_i$ of all $op_i$ in the data processing model.

It should be noted that for the data processing model, the configuration <c,b,p> is shared by all nodes in the entire model network, that is, each operator in the entire data processing model shares the same number of CPUs, batch size, and parallelism. However, since the parameter tensors of each operator are different, the storage locations of the parameter tensors for each operator may be different. Therefore, when the server sets the storage location <L> of the parameter tensors of each operator, actually it is set whether the storage location of each input parameter tensor for the operator is stored on the remote memory node of NUMA.

For different execution environment configurations <c,b,p> of the data processing model, and the storage location set <S> for parameter tensors (whether each of the parameter tensors is stored in a remote memory node), the performance estimating module can first calculate the storage locations of the input parameter tensors for each node, and then for each configuration combination <c,b,p,L>, for each OP, the server can estimate the processing period $t_{op_i}=f_i(c,b,p,L)$ of the op under the configuration combination, and then determine the processing period of the entire data processing model.

For example, if the model structure of the data processing model is a simple linear network, the processing period for the data processing model can be the sum of the processing periods of all OPs, that is $t_N=\Sigma_i t_{op_i}$, if the data processing model contains multiple parallel linear network branches, the data processing process can be considered to be executed in parallel by multiple linear networks. Assuming that the execution period of each linear network is $t_{chain}$, the server can use the maximum value of inference periods of all linear networks as the corresponding data processing period for the entire data processing model, i.e., $t_N=\max_i(t_{chain_i})$.

In step S103, for a data processing period of each of the multiple configuration combinations, an amount of data that is capable to be processed by the data processing model within the data processing period is determined as a target data amount.

In some embodiments, according to the data processing period of each configuration combination in the multiple configuration combinations, the data throughput of the data processing model during the data processing period can be determined as the target data amount.

Since the performance of the data processing model processing process is different under different configuration combinations, in order to ensure that the data processing delay is reduced while minimizing the consumption of server memory during data processing, the server can determine the to-be-processed data that cannot be processed currently, and determine the processing processes that need to be expanded and the configuration for each processing process, when the server load increases. In order to minimize memory consumption, the server can greedily choose a configuration combination that has the maximum throughput and meets the data throughput requirements, until the processing capacity of the expanded instance can comprehensively meet the current data throughput requirements, that is, can process all current to-be-processed data at one time. When the load decreases, in order to minimize memory consumption, the server can release some of the processing processes that have the lowest data throughput.

The server can pre-deploy corresponding processing process expanding and contracting modules, and use the expanding and contracting modules to expand the processing processes and delete redundant processing processes.

For example, the server can first determine the processing requests corresponding to the to-be-processed data that cannot be processed by the data processing model through the expanding and contracting module. The expanding and contracting module can first calculate the processing period $t_N$ for the data processing model N under each configuration combination <c,b,p,S>, and then according to the processing period, calculate the amount $T_{N_i}$ of data that the data processing model can process within the data processing period, and take $T_{N_i}$ as the target data amount, where $$T_{N_i}=\frac{1}{t_N}.$$

In practical applications, the target data amount can be equivalent to the data throughput of the data processing model under the configuration combination.

In step S104, by taking the data processing model to be capable to process the set amount of the to-be-processed data as a target, according to the target data amount for a data processing period of each of the multiple configuration combinations, a target configuration combination is selected from the multiple configuration combinations, and a processing process under the target configuration combination is created.

In step S105, according to the processing process under the target configuration combination, data processing is performed on the to-be-processed data.

In the above process, in order to ensure that the data amount corresponding to the processing request for the current to-be-processed data is met while minimizing memory consumption, the expanding and contracting module can first calculate the target data amounts corresponding to different configuration combinations, and then, select the configuration combination with the largest target data amount as the target configuration combination each time, and create the processing process (function instance) under the target configuration combination. In this case, the remaining processing requests are reduced. Then, the server can select the new target configuration combination with the largest amount of data as the new target configuration combination, and continue to create a new processing process until the data processing model can process the set amount of the to-be-processed data at one time under the current processes, and the server can complete all processing requests.

In other words, let the amount of to-be-processed data that the data processing model cannot process be R. Every time a new processing process is generated, R will be reduced accordingly, i.e., $R=R-T_{N_i}$. During this process, the configuration combination with the largest target data amount will be continuously selected as the target configuration combination and a new processing process will be extended until $R\leq 0$, which indicates that the data processing model can process the set amount of the to-be-processed data at one time in the extended processing processes. The server can complete all processing requests at one time, and the number of extended processing processes is the minimum at this time.

It should be noted that during this process, the expanding and contracting module does not know in advance which server node the extended processing process will be scheduled to, nor does it know which OPs in the scheduled instance access the remote memory nodes of NUMA. Therefore, the expanding and contracting module can assume that at least some nodes in the data processing model access the remote memory nodes and construct a new processing process under such assumptions.

In other words, if all OPs in the data processing model access remote memory and the newly generated processing process can complete all processing requests, then when instance scheduling (scheduling processing process) is actually executed, even if some or all operators in the processing process are changed to access remote memory nodes, it will not cause performance loss during the data processing process. In this way, in the scheduling process of processing processes, there will be fewer constraints and greater decision space, thus reducing more memory consumption. The scheduling process of the processing process will be described in detail below, and will not be described in detail here.

Since the expanding and contracting module sets the storage locations of all parameter tensors in all configuration combinations as remote memory nodes during the expansion processing process, this conservative approach may expand too many instances, thereby increasing memory loss. Therefore, when all processing processes are scheduled to server nodes, the expanding and contracting module can delete redundant processing processes according to the actual access of each node to the storage location, to save memory. In practical applications, the redundant processing process can be a processing process that is idle during data processing. Even if the redundant processing process is deleted during the process, the server can still complete all processing requests at one time.

In practical applications, users usually set a service quality constraint period, which limit the delay of the server in completing all processing requests to no more than the service quality constraint period $t_{slo}$ of the server. Therefore, in the process of determining the target configuration combination, the server will first determine the configuration combinations that do not meet the requirements. These configuration combinations that do not meet the requirements will cause $t_N > t_{slo}$. Then, the server can filter out these configurations combinations that do not meet the requirements through the expanding and contracting module.

Furthermore, when all OPs in the data processing model access remote memory nodes, the data processing period is t_upper, and when all OPs access local memory nodes the data processing period is t_lower. In this case, it may exist that t_upper>t_slo, and t_lower<t_slo. Therefore, for the configuration combination <c,b,p,S> that has the above situation, the server can first set each element in <S> to false, i.e., it is assumed that all OPs access local memory nodes. Then, for each element in <S>, the element is set to true, that is, each parameter tensor is separately stored to the remote memory node. For example, the tensor i in <S> is stored to the remote memory node, and the latency rise time $t_{delta_i}$ caused by changing to stored at the remote node is calculated, where $t_{delta_i}$ represents the deference between the second processing time $t_{op\_upper_i}$ of the overall data processing model after changing the parameter tensor i to be stored in the remote memory node and the first processing time $t_{op\_lower_i}$ of the data processing model in the original situation of storing the parameter tensor on the local NUMA memory node, that is, $t_{delta_i}=t_{op\_upper_i}-t_{op\_lower_i}$, where the overall network latency rise time can be obtained by calling the performance estimating module. The performance estimating module will be described in detail below and will not be described in detail here.

Next, the expanding and contracting module can calculate the greedy coefficient $$g_i = \frac{m_i}{t_{delta_i}}$$

of the parameter tensor i, where $m_i$ represents the memory size occupied by the tensor i. The expanding and contracting module can select the parameter tensor with the highest $g_i$ each time and use it as the target parameter tensor that allows remote access, that is, set the i-th element in <S> to true, and recalculate the data processing period $t_N$ of the entire data processing model, and repeat the above steps until t_N>t_slo. Thus, the configuration combination when the target parameter tensor satisfying $t_N$<t_slo is stored in the remote memory node is used as the target configuration combination. In this way, the server can set some nodes in the network to access remote memory nodes, and other nodes in the network not to access remote memory, thereby reducing memory consumption as much as possible while meeting service quality constraint period of the user.

Finally, due to the errors in calculating the processing periods of the data processing model under different configuration combinations by the expanding and contracting module, and the conservative strategy in the process expanding process, the system may expand too many processing processes, resulting in more memory consumption. Therefore, the server can continuously check the actual throughput (target data amount) of processing processes in the system through the expanding and contracting module, and delete excess processing processes (delete the one with the lowest actual throughput each time).

Since different processing processes have different configurations <c,b,p,S>, and have different processing capabilities, when balancing the load of processing requests, it is necessary to consider the differences between different processing processes. Therefore, the server can pre-deploy a corresponding request forwarding module, which can forward processing requests and complete load balancing of processing requests.

The request forwarding module can use a method of weighted random for load balancing, that is, forward more processing requests to processing processes with strong processing capabilities, more processing requests corresponding to relatively more to-be-processed data, and forward relatively fewer processing requests to processing processes with weak processing capabilities, fewer processing requests corresponding to less to-be-processed data.

For example, for each processing process, the request forwarding module can first obtain the actual data throughput $T_{real}$ of the processing process (i.e. the actual recorded value in the server). But in practical applications, there may be situations where the processing process has not been accessed before, so the actual throughput (target data amount) may not be obtained. In a case where the actual target data amount cannot be obtained, the request forwarding module can first obtain the actual configuration <c,b,p,S> of the processing process, and then call the performance estimating module to obtain the data processing period $t_N$ of the data processing model N, and according to this, the target data amount $T_{estimate}$ of the data processing model in the processing process $n_i$ can be estimated.

Next, for all processing processes, the request forwarding module can set its T_real or its $T_{estimate}$ as the weight for load balancing, and ultimately execute a weighted random load balancing strategy. The larger the target data amount corresponding to the processing process, the greater the weight of load balancing, and the more processing requests and to-be-processed data allocated to it. The smaller the target data amount, the smaller the weight of load balancing, and the less processing requests and to-be-processed data allocated to it.

In addition, to address the issue of tensor redundancy, during the process of loading the data processing model, the server can first traverse the calculation graph of the data processing model, determine the parameter tensors that need to be loaded during the processing of the to-be-processed data by the data processing model, and add these parameter tensors to the loading queue.

The server can pre-set and pre-deploy a corresponding model loading module, to load the parameter tensors that the data processing model needs to call through the model loading module.

The server can then randomize the parameter tensors in the loading queue through the model loading module to reduce subsequent lock competition. For each parameter tensor in the loading queue, the model loading module can first read a hash value of the parameter tensor in the pre-stored model file.

The model loading module can obtain the tensor lock corresponding to each parameter tensor according to the identity document (ID) of the hash value corresponding to each parameter tensor. For each parameter tensor, if there is no tensor lock corresponding to the parameter tensor in the server, the model loading module can create a tensor lock corresponding to the parameter tensor according to its corresponding hash value.

At the same time, the model loading module can use the hash value of the parameter tensor as the ID, to access the preset tensor storage module, query whether the parameter tensor is already stored in the tensor storage module of the local memory node. If so, the model loading module can map the parameter tensor memory in the local memory node using a memory mapping method and load the parameter tensor. Otherwise, the server can use the hash value of the parameter tensor as the ID, to query the configuration file to determine whether the parameter tensor is allowed to be stored in remote memory under the current configuration.

If not allowed, the model loading module can create corresponding a memory region in the local tensor storage module, and read the corresponding parameter values from the model file to add them to the corresponding memory node of the memory region.

If the parameter tensor is allowed to be stored in remote memory under the current configuration, for each remote memory node, the tensor storage module on the remote memory node can determine whether the parameter tensor is stored in the remote memory node. If so, the model loading module can map the parameter tensor memory in the remote memory node through memory mapping method and load the parameter tensor. Otherwise, a corresponding memory region is created in the local tensor storage module, the corresponding parameter values are read from the model file and added to the corresponding memory node in the memory region.

During this process, for each parameter tensor loaded, the model loading module can release the tensor lock corresponding to the parameter tensor until all parameter tensors in the loading queue is loaded. The model loading module can process the to-be-processed data according to the processing processes under the newly created target configuration combinations and the loaded parameter tensors.

It should be noted that the tensor storage module mentioned above stores the memory (parameters, constants, etc.) of all parameter tensors, and the tensor storage module is shared among all processing processes on the server node by default. Each processing process on the same server node can access parameter tensors in the tensor storage module. Since hash values are independent of the bottom framework of processing model, each parameter tensor is uniquely identified by a hash value that can be calculated based on the corresponding content and dimensions of the parameter tensor.

In addition, each parameter tensor also corresponds to a corresponding tensor lock to ensure the safe operation of its construction, mapping, or reclaiming. The tensor storage module is initially empty and does not hold any tensors or locks. During the operation of the system, the model loading module continuously adds parameter tensors to it during the process of loading parameter tensors. Each parameter tensor is assigned a reference count after created. Whenever the model loading module adds a new mapping to an existing parameter tensor, the reference count increases by 1. Similarly, whenever a processing process is released after completed, the reference count decreases by 1.

Moreover, although the parameter tensor storage module is shared by all processing processes on the same server node by default, it is also supported to have a separate tensor storage module for specific combination of processing processes (such as functions belonging to the same tenant), and different parameter tensor storage modules are not visible to each other.

Since there are multiple NUMA memory nodes on a server node, the server can create a tensor storage module on each NUMA memory node. The model loading module determines which tensor storage module to allocate the parameter tensor at runtime, and the tensor reclaiming module ensures that all tensor storage modules are correctly reclaimed.

During the data processing of the to-be-processed data, since the memory of the same parameter tensor may be called by multiple different processing processes at the same time, the server can reclaim the parameter tensor when detecting that the reference count of the parameter tensor is cleared to 0).

During the process of loading parameter tensors, every time the server adds a new mapping to the existing parameter tensor, and the reference count of the parameter tenser increases by 1. Similarly, every time a process that calls the parameter tensor is completed and released, the reference count corresponding to the parameter tensor will be reduced by 1. Therefore, the server can determine the mapping times corresponding to each parameter tensor according to the processing processes included in the data processing model, and then determine the reference count corresponding to each parameter tensor according to the mapping times. Then, for each parameter tensor, the server can reclaim the parameter tensor and release the memory occupied by it when detecting that the reference count corresponding to the parameter tensor is cleared to 0.

In order to accelerate the creation of subsequent processing processes, the server can perform latency reclaim on parameter tensors. For each parameter tensor, after monitoring that the count of the parameter tensor is reset, the server can retain the parameter tensor for a preset duration in memory and then reclaim the parameter tensor. The preset duration can be set according to the actual situation, which is not limited in the present disclosure.

In addition, the server can further set a storage limit value for a tensor storage module. When the server detects that the tensor storage module reaches the storage limit value, the server can reclaim the parameter tensor that has not been used for the longest time.

The server can also dynamically determine how long each parameter tensor remains in memory after its reference count is cleared, according to a histogram of how often each parameter tensor has been accessed over time.

It should be noted that the process of parameter tensor reclaiming by the server can be completed through a pre-set tensor reclaiming module. Each server node can deploy and run an instance of the tensor reclaiming module. The tensor reclaiming module is responsible for the reclaiming of parameter tensor memory in the tensor storage module on all NUMA memory nodes in the server node. For ease of understanding, the present disclosure provides a schematic diagram of a mapping manner of parameter tensors in a single server node, as shown in FIG. 3.

Figure 3:
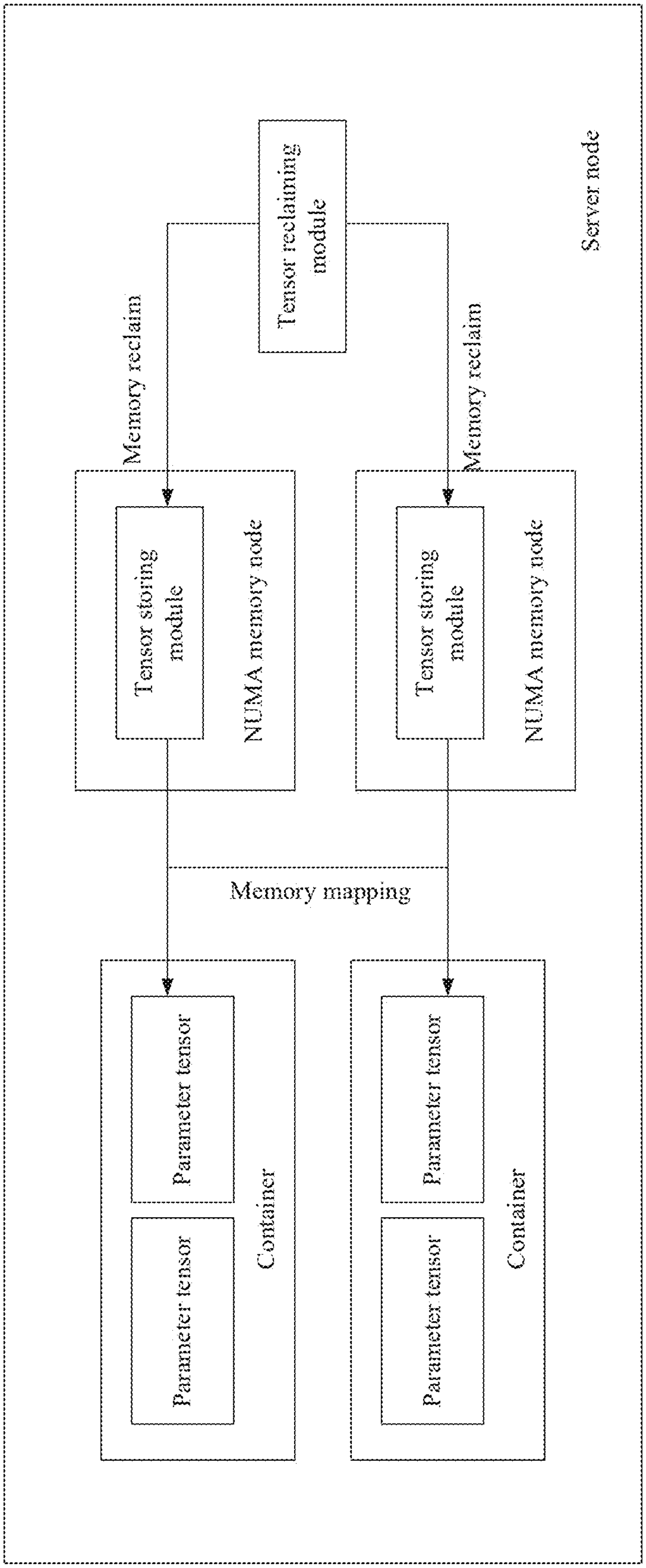
FIG. 3 is a schematic diagram of a mapping manner of parameter tensors in a single server node provided in the present disclosure.

FIG. 3 is a schematic diagram of a mapping manner of parameter tensors in a single server node provided in the present disclosure.

In FIG. 3, there are multiple containers in a server node, and each container corresponds to a function instance (processing process). The tensor storage module can map the parameter tensors of the data processing model stored in the NUMA memory node to the corresponding container through memory mapping. In addition, during the data processing process, the tensor reclaiming module can reclaim the memory of the parameter tensor with a reference count of 0.

Since all processing processes on the same server node can share parameter tensors with each other, and processing processes on different server nodes cannot be shared. Different processes scheduled to different server nodes can share different proportions of parameter tensors, so scheduling locations of processing processes needs to be chosen appropriately to minimize the memory consumption of the system.

For example, the server can set and deploy the corresponding scheduling module. After the scheduling module receives the request to schedule a new processing process, the scheduling module will decode the configuration combination of the processing process to be scheduled (such as the number of CPUs, parallelism, etc.) from the request, and whether each parameter tensor in the data processing model N that runs on the processing process allows remote NUMA memory access, Then the scheduling module can get the set $T_{NS}$ of parameter tensors in the whole data processing model that can be shared by remote NUMA memory. In addition, the server can set the set of all parameter tensors in the network as $T_N$.

When executing scheduling, the scheduling module will first filter out server nodes that do not meet the memory and CPU requirements of the processing process, and select the remaining server nodes that meet the requirements as candidate server nodes. For each candidate server node, since there may be multiple NUMA nodes on the candidate server node, the server can further filter out NUMA nodes that do not meet resource requirements.

If there are K NUMA nodes on a candidate server node that meets the condition, there are corresponding tensor storage modules on each of the K NUMA nodes, where the tensor set in the i-th tensor storage module is $T_{store_i}$. In this case, if the processing process is scheduled to the j-th NUMA node, the set of tensors that the processing process can share on the local NUMA node is $T_{local_j}=T_N \cap T_{store_j}$, and the set of tensors that the function can share on the remote memory node can be represented as:

$$T_{remote_j} = T_{NS} \cap \bigcup_{(i \neq j)} T_{store_j}$$

The set of all tensors that the processing process can share on the server node is:

$$T_{share_j}=T_{local_j} \cup T_{remote_j}$$

In this case, the server can calculate the sum $M_j$ of memories of all tensors in $T_{share_j}$. For all $j \in [1,K]$, the server can calculate the corresponding sum $M_j$ of memory, and the maximum amount of memory that the processing process can share on the current server node can be expressed as:

$$M_{max_{share}} = \max_j M_j$$

Then the server can calculate the maximum amount of memory on all server nodes that meet the resource conditions, and schedule the processing process to the corresponding NUMA memory node on the server node with the maximum amount ($M_{max_{share}}$) of memory.

In the actual execution of data processing, the server can construct a complete data processing system through the aforementioned modules, and complete the processing of the to-be-processed data through the data processing system. For the sake of easy understanding, the present disclosure provides a structural diagram of a data processing system, as shown in FIG. 4.

Figure 4:
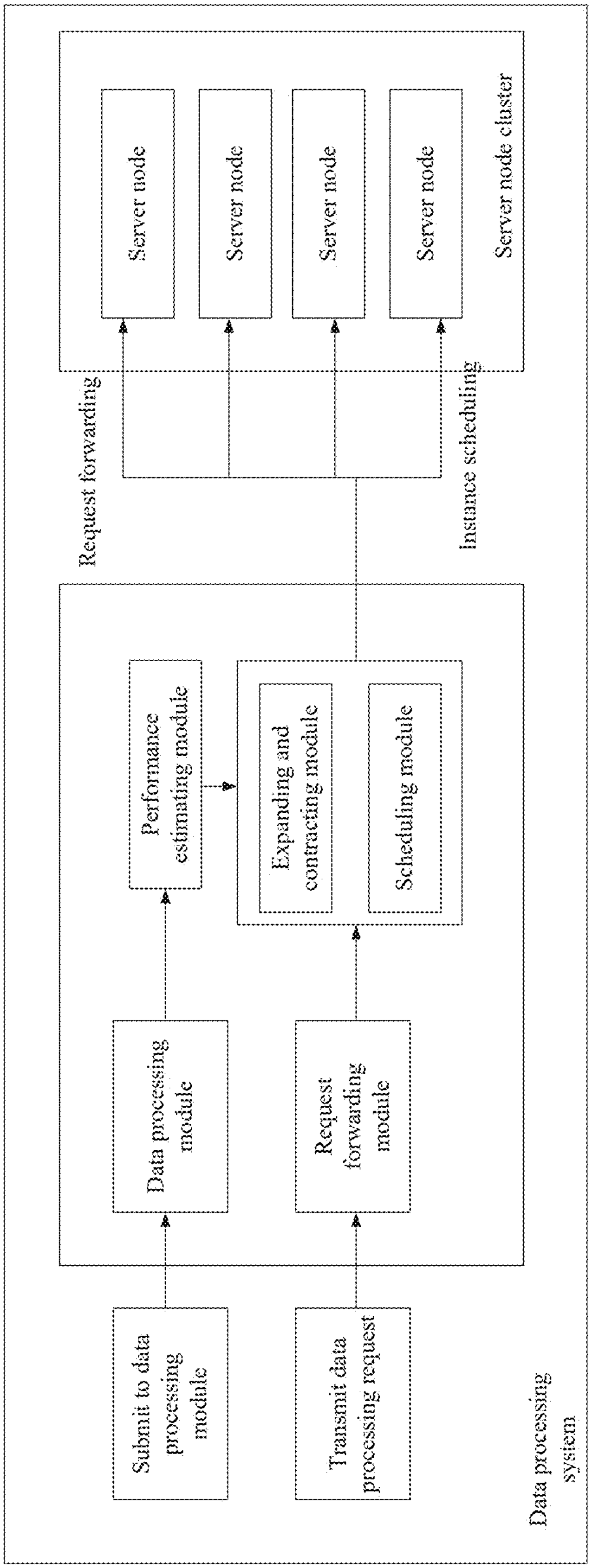
FIG. 4 is a structural schematic diagram of a system for data processing provided in the present disclosure.

FIG. 4 is a structural schematic diagram of a system for data processing provided in the present disclosure.

In FIG. 4, the server is deployed with a data processing model submitted by developers. After the user sends data processing requests, the server first performs load balancing through the request forwarding module to allocate the processing requests to different processing processes for processing. The expanding and contracting module will expand the processing processes according to the received processing requests and the data throughputs under different configuration combinations obtained by the performance estimating module. Then, the scheduling module schedule the extended processing processes (function instances) to the designated server nodes and forward the processing requests.

Additionally, it should be noted that the data processing system further includes a corresponding model loading module, a tensor reclaiming module, and a tensor storage module (not shown in FIG. 4). These modules are used to load the parameter tensors that the data processing model needs to call, reclaim idle parameter tensors during the data processing process, and store parameter tensor processes.

As a whole, the data processing system mentioned above can be divided into two layers, i.e., the decision layer and the execution layer. The decision goal is to reduce the overall memory consumption of the system through memory sharing under the premise of ensuring inference performance under the NUMA architecture. For each processing process, it first goes through the decision layer to determine the configuration of the function instance, such as CPU, memory, batch size, parallelism, and the memory location of each parameter tensor included in the data processing model (whether it can be placed in remote memory), and the function instance is scheduled to a specific NUMA memory node on a specific server. The execution layer is responsible for initializing the process and setting parameters according to specific configurations, and setting corresponding mapping relationships of parameter tensors and memories.

The components of the decision layer include a model inference module, a performance estimating module, an expanding and contracting module, and instance scheduling module. The components of the execution layer mainly include a tensor loading module, a tensor storage module, and a tensor reclaiming module. For ease of understanding, the present disclosure further provides a structural schematic diagram of the decision layer of a data processing system, as shown in FIG. 5.

Figure 5:
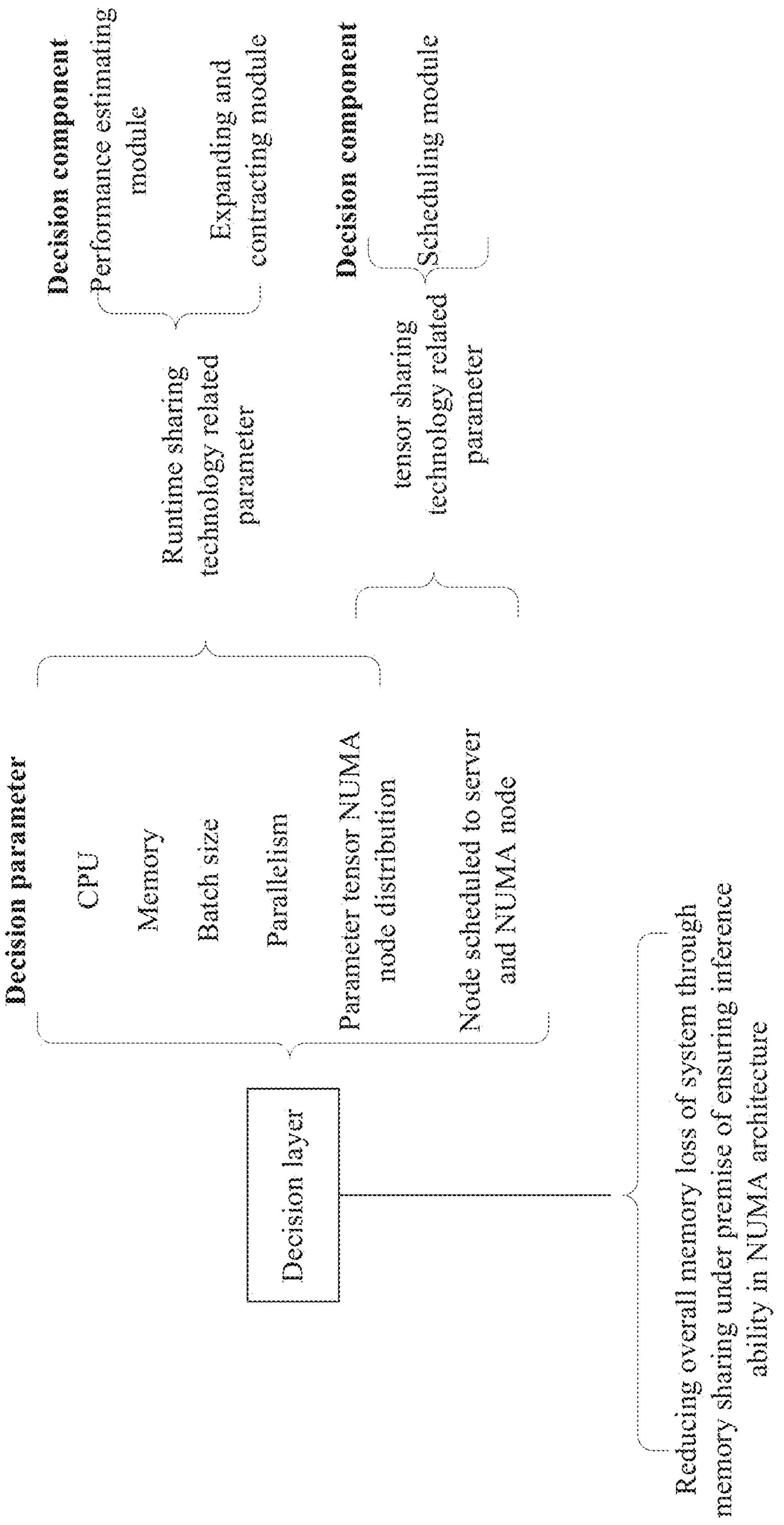
FIG. 5 is a structural schematic diagram of a decision layer of a system for data processing provided in the present disclosure.

FIG. 5 is a structural schematic diagram of a decision layer of a system for data processing provided in the present disclosure.

In FIG. 5, the decision parameters of the decision layer can include different configurations in the configuration combinations. These decision parameters are used by decision components such as the performance estimating module and the expanding and contracting module to runtime sharing technology. The node distribution of parameter tensors, and the server nodes and NUMA memory nodes to which the extended processing process is scheduled, will serve as relevant parameters for the scheduling module to run tensor sharing technology. The goal of the entire decision layer is to reduce the overall memory loss of the system through memory sharing under the premise of ensuring inference ability under the NUMA architecture.

It should be noted that the to-be-processed data mentioned in the present disclosure can be image data, audio data, or text data. Correspondingly, the process of processing the to-be-processed data can include image recognition or image classification of the image data, voiceprint recognition of the audio data, and text extraction or semantic recognition of the text data. It may also include other types of to-be-processed data and corresponding data processing methods, which is not limited in the present disclosure.

From the above methods, it can be seen that this solution can determine the data throughput of the data processing model under different configuration combinations when it is determined that the data processing model cannot process all the to-be-processed data at one time under the current processing process, and then select the corresponding target configuration combination to expand a new processing process, which ensures that with expanding fewer processing processes, the data processing model can process all the to-be-processed data at one time, and reduce the use of server memory resources without increasing the delay time of the data processing process.

In addition, the present disclosure proposes a runtime sharing strategy that combines request batch processing with increasing the parallelism of processing processes, and designs corresponding algorithms of performance prediction and dynamic expanding and contracting for tensor NUMA memory node distribution. During function expanding and contracting, memory efficiently sets corresponding configurations for each extended processing process, and designs corresponding processing request forwarding mechanisms for non-consistent function instances. For tensor sharing, the present disclosure first proposes a secure, lightweight, and performance insensitive tensor sharing mechanism between multiple NUMA memory nodes and between function instances on the same server node, which allows multiple processing processes to transparently recognize and share memory of the same tensor parameters. Additionally, different processing processes are scheduled to different server nodes and share different proportions of parameter tensors on NUMA memory nodes, which can fully reduce the memory consumption of cluster-level server nodes through the server node scheduling algorithm.

Compared to existing work, this solution has significant results. Compared with the latest serverless inference system, this solution reduces memory usage by up to 93% and increases function deployment density by 30 times. At the same time, it can also ensure the processing efficiency of the data processing model and accelerate the creation time of over 90% of function instances (processing processes), greatly accelerating the cold start and expansion and contraction of function instances.

The above are one or more methods for implementing data processing in the present disclosure. Based on the same idea, the present disclosure further provides a corresponding apparatus for data processing, as shown in FIG. 6.

Figure 6:
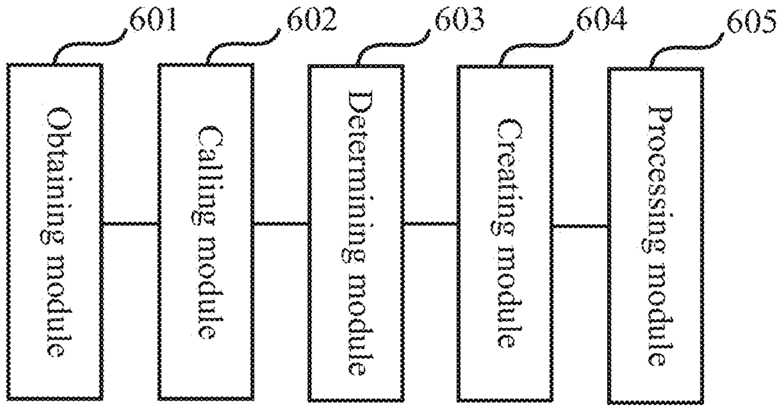
FIG. 6 is a schematic diagram of an apparatus for data processing provided in the present disclosure.

FIG. 6 is a schematic diagram of an apparatus for data processing provided in the present disclosure.

an obtaining module 601, configured to obtain to-be-processed data;

a calling module 602, configured to determine whether a set amount of the to-be-processed data is capable to be processed under a current processing process by a data processing model, in response to determining that the set amount of the to-be-processed data cannot be processed under the current processing process by the data processing model, obtain data processing periods of the data processing model under multiple configuration combinations;

a determining module 603, configured to, for a data processing period of each of the multiple configuration combinations, determine an amount of data that is capable to be processed by the data processing model within the data processing period, as a target data amount;

a creating module 604, configured to, by taking the data processing model to be capable to process the set amount of the to-be-processed data as a target, according to the target data amount for a data processing period of each of the multiple configuration combinations, select a target configuration combination from the multiple configuration combinations, and create a processing process under the target configuration combination; and a processing module 605, configured to, according to the processing process under the target configuration combination, perform data processing on the to-be-processed data.

In some embodiments, the configuration combination includes at least one of a quantity of central processing units, a batch processing size, data parallelism, or storage locations of a parameter tensor for an operator, where the storage locations of the parameter tensor include a local memory node and a remote memory node.

In some embodiments, before obtaining the data processing periods of the data processing model under the multiple configuration combinations, the calling module 602 is further configured to input the multiple configuration combinations into a preset performance estimating model, and for each of the multiple configuration combinations, determine a data processing period of each operator included in the data processing model under the configuration combination through the performance estimating model; and according to the data processing period of each operator under the configuration combination, determine a corresponding data processing period of the data processing model under the configuration combination.

In some embodiments, the calling module 602 is further configured to, in a case where the data processing model includes at least two parallel linear networks, determine a corresponding data processing period for each of the at least two linear networks under the configuration combination; and take a maximum value of the data processing periods for the at least two linear networks under the configuration combination as the data processing period of the data processing model under the configuration combination.

In some embodiments, the creating module 604 is further configured to, according to the target data amount for the data processing period of each of the multiple configuration combinations, select the target configuration combination from the multiple configuration combinations, and create the processing process under the target configuration combination; and determine whether the data processing model is capable to process the set amount of the to-be-processed data after creating the processing process under the target configuration combination; in response to determining that the data processing model is unable to process the set amount of the to-be-processed data, determine a new target configuration combination from other configuration combinations except the target configuration combination according to the target data amount for the data processing period of each of the multiple configuration combinations, and create a new processing process under the new target configuration combination, until the data processing model is capable to process the set amount of the to-be-processed data.

In some embodiments, the creating module 604 is further configured to, for each of the multiple configuration combinations, set storage locations of parameter tensors in the target configuration combination as remote memory nodes; and according to an actual target data amount of the data processing model, delete an excess processing process.

In some embodiments, the creating module 604 is configured to, for each of the multiple configuration combinations, in response to determining that parameter tensors in the configuration combination are stored in the local memory node, determine the data processing period for the data processing model under the configuration combination as a first processing period; for each of the parameter tensors in the configuration combination, determine the data processing period for the data processing model when the parameter tensor is stored in the remote memory node, as a second processing period; according to the first processing period and the second processing period, determine an increased data processing period after changing the parameter tensor from being stored in the local memory node to being stored in the remote memory node, as a latency rise time; according to a memory size occupied by the parameter tensor and the latency rise time for the parameter tensor, determine a greedy coefficient for the parameter tensor; and determine a parameter tensor with a highest greedy coefficient as a target parameter tensor that allows remote access; determine the data processing period for the data processing model when the target parameter tensor is stored in the remote memory node; and determine whether the data processing period is greater than a preset service quality constraint period; in response to determining that the data processing period is less than or equal to the preset service quality constraint period, determine the configuration combination where the target parameter tensor is stored in the remote memory node as the target configuration combination.

In some embodiments, the latency rise time for the parameter tensor is negatively correlated with the greedy coefficient for the parameter tensor, and the memory size occupied by the parameter tensor is positively correlated with the greedy coefficient for the parameter tensor.

In some embodiments, the creating module 604 is further configured to, in response to determining that the data processing period is less than the service quality constraint period when the target parameter tensor is stored in the remote memory node, determine a next target parameter tensor and the data processing period for the data processing model when the next target parameter tensor is stored in the remote memory node, until the data processing period is greater than the service quality constraint period.

In some embodiments, the processing module 605 is configured to, according to multiple target configuration combinations respectively corresponding to multiple processing processes, determine a target data amount corresponding to each of the multiple processing processes; and according to the target data amount corresponding to each of the multiple processing processes, allocate the to-be-processed data required to be processed by the multiple processing processes.

In some embodiments, the processing module 605 is configured to determine parameter tensors that the data processing model needs to load; for each of the parameter tensors, determine whether the parameter tensor is stored in the local memory node; in response to determining that the parameter tensor is stored in the local memory node, map a parameter tensor memory in the local memory node through memory mapping and load the parameter tensor; in response to determining that the parameter tensor is not stored in the local memory node, determine whether the parameter tensor is allowed to be stored in the remote memory node under a current configuration combination; in a case where the parameter tensor is allowed to be stored in the remote memory node under the current configuration combination, in response to determining that the parameter tensor is stored in the remote memory node, map a parameter tensor memory in the remote memory node through memory mapping and load the parameter tensor; according to the processing process under the target configuration combination and the loaded parameter tensor, perform data processing on the to-be-processed data.

In some embodiments, the processing module 605 is further configured to, in response to determining that the parameter tensor is not allowed to be stored in the remote memory node under the current configuration combination, create a memory region in a local memory and adding the parameter tensor to the local memory node corresponding to the memory region.

In some embodiments, the processing module 605 is further configured to, in response to determining that the parameter tensor is allowed to be stored in the remote memory node under the current configuration combination and the parameter tensor is not stored in the remote memory node, create a memory region in a local memory and adding the parameter tensor to the local memory node corresponding to the memory region.

In some embodiments, the processing module 605 is further configured to, for each of the parameter tensors, determine a hash value for the parameter tensor; and by taking the hash value as authentication information for the parameter tensor, access the local memory node and determine whether the parameter tensor is stored in the local memory node.

In some embodiments, the processing module 605 is further configured to, according to a processing process included in the data processing model, determine mapping times for each of the parameter tensors; according to the mapping times for each of the parameter tensors, determine a reference count for each of the parameter tensors; and for each of the parameter tensors, in response to determining that the reference count for the parameter tensor is reset during data processing of the to-be-processed data, reclaim a tensor memory for the parameter tensor.

In some embodiments, the creating module 604 is configured to, for each processing process, according to a memory size and a CPU quantity for the processing process, filter out server nodes that do not meet requirements of the configuration combination, and determine remaining server nodes as candidate server nodes; for each of the candidate server nodes, determine a maximum memory that is allowed to be shared on the candidate server node; and according to the maximum memory that is allowed to be shared on each of the candidate server nodes, select a designated server node as a target server node, and schedule the processing process to the target server node.

In some embodiments, the method is applied to a serverless platform, and the local memory node and the remote memory node are memory nodes on a non-uniform-memory-access memory.

The present disclosure further provides a computer readable storage medium that stores a computer program, where the computer program may be configured to perform a method for data processing as provided in FIG. 1 above.

Figure 7:
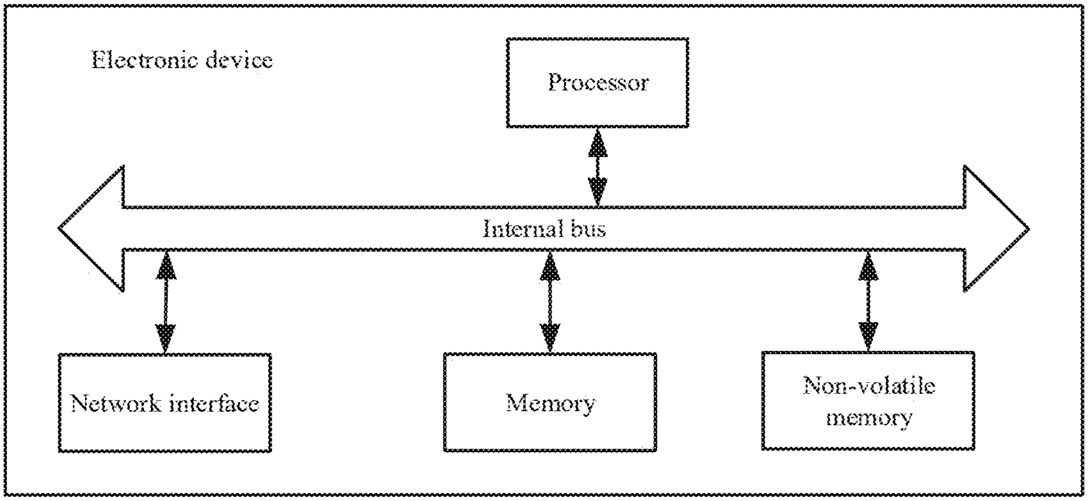
FIG. 7 is a schematic diagram of an electronic device corresponding to the method shown in FIG. 1 provided in the present disclosure.

The present disclosure further provides a schematic structural diagram of an electronic device corresponding to FIG. 1, as shown in FIG. 7. As shown in FIG. 7, at the hardware level, the electronic device includes a processor, an internal bus, a network interface, a memory, and a non-volatile memory, and may include hardware required for other operations. The processor reads the corresponding computer program from the non-volatile memory into the memory and then runs the computer program, to implement the method for data processing described in FIG. 1 above. Of course, in addition to the software implementation, the present disclosure does not exclude other implementation methods, such as logic devices or a combination of hardware and software, etc. That is, the executive of the following processing process is not limited to individual logic units, but can also be hardware or logic devices.

It was clear that improvements to a technology could be distinguished between hardware improvements (e.g., improvements to circuit structures such as diodes, transistors, switches, etc.) and software improvements (improvements to a method flow). However, with the development of technology, currently, the improvements of many method flows can be regarded as the direct improvements of the hardware circuit structures. Designers almost always get the corresponding hardware circuit structure by programming the improved method flow into the hardware circuit. Therefore, it cannot be said that a method flow improvement cannot be implemented with a hardware physical module. For example, a Programmable Logic Device (PLD) (e.g., Field Programmable Gate Array (FPGA)) is one such integrated circuit whose logic function is determined by user programming of the device. A digital system is "integrated" on a PLD by the designer's own programming, without the need for a chip manufacturer to design and manufacture a dedicated integrated circuit chip. Moreover, nowadays, instead of making IC chips manually, this programming is mostly implemented by "logic compiler" software, which is similar to the software compiler used for program development and writing, and the original code has to be written in a specific programming language before it is compiled. This is called Hardware Description Language (HDL), and there is not only one HDL, but many kinds, such as Advanced Boolean Expression Language (ABEL), Altera Hardware Description Language (AHDL), Confluence. Cornell University Programming Language (CUPL), HDCal, Java Hardware Description Language (JHDL), Lava, Lola, MyHDL, PALASM, Ruby Hardware Description Language (RHDL), etc. Currently, the most commonly used is Very-High-Speed Integrated Circuit Hardware Description Language (VHDL) and Verilog. It should also be clear to those skilled in the art that a hardware circuit implementing the logical method flow can be easily obtained by simply programming the method flow with a little logic in one of the above hardware description languages and programming the method flow into the integrated circuit.

The controller can be implemented in any suitable manner, for example, the controller can take the form of, for example, a microprocessor or processor and a computer readable medium storing computer readable program code (e.g. software or firmware) executable by the (micro) processor, logic gates, switches, Application Specific Integrated Circuit (ASIC), programmable logic controllers and embedded microcontrollers. Examples of the controllers may include, but are not limited to, the following microcontrollers: ARC 625D, Atmel AT91SAM, Microchip PIC18F26K20, and Silicone Labs C8051F320, and memory controllers may also be implemented as part of the control logic of the memory. It is also known to those skilled in the art that, in addition to implementing the controller in a purely computer readable program code manner, it is entirely possible to make the controller perform the same function in the form of logic gates, switches, specialized integrated circuits, programmable logic controllers, embedded microcontrollers, etc. by logically programming the method steps. Thus, such a controller can be considered as a hardware component, and the devices included therein for implementing various functions can also be considered as structures within the hardware component. Or even, the apparatus for implementing various functions can be considered as both a software module for implementing a method and a structure within a hardware component.

The systems, apparatuses, modules, or units elucidated in the above embodiments can be implemented specifically by a computer chip or entity, or by a product with certain functions. An exemplary implementation device is a computer. Specifically, the computer may be, for example, a personal computer, a laptop computer, a cellular phone, a camera phone, a smart phone, a personal digital assistant, a media player, a navigation device, an email device, a gaming console, a tablet computer, a wearable device, or a combination of any of these devices.

For the convenience of description, the above devices are divided into various units according to their functions and described respectively. It is, of course, possible to implement the functions of each unit in the same or multiple software and/or hardware when implementing the present disclosure.

It should be understood by those skilled in the art that embodiments of the present disclosure may be provided as methods, systems, or computer program products. Accordingly, the present disclosure may take the form of an entirely hardware embodiment, an entirely software embodiment, or an embodiment combining software and hardware aspects. Furthermore, the present disclosure may employ the form of a computer program product implemented on one or more computer-usable storage media (including, but not limited to, disk storage, CD-ROM, optical storage, etc.), where the one or more computer-usable storage media having computer-usable program code.

the present disclosure is described with reference to flowcharts and/or block diagrams of methods, devices (systems), and computer program products according to embodiments of the present disclosure. It is to be understood that each process and/or block in the flowchart and/or block diagram, and the combination of processes and/or blocks in the flowchart and/or block diagram, may be implemented by computer program instructions. These computer program instructions may be provided to a processor of a general-purpose computer, a specialized computer, an embedded processor, or other programmable data processing device to produce a machine such that instructions executed by the processor of the computer or other programmable data processing device produce a apparatus for implementing a function specified in one or more processes of the flowchart and/or one or more blocks of the block diagram.

These computer program instructions may also be stored in a computer-readable memory capable of directing the computer or other programmable data processing device to operate in a particular manner such that the instructions stored in the computer-readable memory produce an article of manufacture including an instruction apparatus that implements the function specified in one or more processes of the flowchart and/or one or more blocks of the block diagram.

These computer program instructions may also be loaded onto a computer or other programmable data processing device such that a series of operational steps are executed on the computer or other programmable device to produce computer-implemented processing such that the instructions executed on the computer or other programmable device provide the steps used to perform the functions specified in one or more processes of the flowchart and/or one or more blocks of the block diagram.

In an exemplary configuration, the computing device includes one or more processors (CPUs), input/output interfaces, network interfaces, and memory.

Memory may include at least one of non-permanent storage in computer readable media, random access memory (RAM) or non-volatile memory, such as read only memory (ROM) or flash RAM. Memory is an example of a computer readable medium.

Computer readable media include permanent and non-permanent, removable and non-removable media that can be implemented by any method or technology to store information. Information may be computer readable instructions, data structures, modules of a program, or other data. Examples of storage media for computers include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read only memory (CDROM), digital versatile disc (DVD) or other optical storage, magnetic cartridge tape, magnetic tape magnetic disk storage, other magnetic storage device or any other non-transport medium that can be used to store information that can be accessed by a computing device. As defined herein, computer readable media does not include transitory computer readable media, such as modulated data signals and carriers.

It should also be noted that the term "include", "comprise" or any other variation thereof is intended to cover non-exclusive inclusion, such that a process, method, article, or device that includes a set of elements includes not only those elements, but also other elements that are not explicitly listed, or other elements that are inherent to such a process, method, commodity, or device. Without further limitation, the element defined by the statement "including a . . . " do not preclude the existence of additional identical elements in the process, method, article, or device that include the element.

It should be understood by those skilled in the art that embodiments of the present disclosure may be provided as methods, systems or computer program products. Accordingly, the present disclosure may take the form of an entirely hardware embodiment, an entirely software embodiment, or an embodiment combining software and hardware aspects. Furthermore, the present disclosure may employ the form of a computer program product implemented on one or more computer-usable storage media (including, but not limited to, disk storage, CD-ROM, optical storage, etc.), where the one or more computer-usable storage media having computer-usable program code.

The present disclosure may be described in the general context of computer-executable instructions executed by a computer, such as a program module. Generally, a program module includes routines, programs, objects, components, data structures, and the like that perform a specific task or implement a specific abstract data type. The present disclosure may also be practiced in distributed computing environments where tasks are performed by remote processing devices that are connected via a communication network. In distributed computing environments, program modules may be located in local and remote computer storage medium, including storage devices.

The various embodiments in the present disclosure are described in a progressive manner, and the same or similar parts between the various embodiments may be referred to each other, and each embodiment focuses on the differences from other embodiments. In particular, for a system embodiment, since it is basically similar to the method embodiment, the description is relatively simple, and for related parts, please refer to the partial description of the method embodiment.

The invention claimed is:

1. A method for data processing, comprising:

obtaining to-be-processed data;

determining whether a data processing model is capable of processing at least a set amount of the to-be-processed data under a current processing process, in response to determining that the data processing model is not capable of processing at least the set amount of the to-be-processed data under the current processing process, obtaining data processing periods of the data processing model under multiple configuration combinations;

for a data processing period of each of the multiple configuration combinations, determining an amount of data that is capable of being processed by the data processing model within the data processing period, as a target data amount;

by taking the data processing model to be capable of processing at least the set amount of the to-be-processed data as a target, according to the target data amount for the data processing period of each of the multiple configuration combinations, selecting a target configuration combination from the multiple configuration combinations, and creating a processing process under the target configuration combination; and according to the processing process under the target configuration combination, performing data processing on the to-be-processed data, comprising:

determining, from parameter tensors for operators of the data processing model, the parameter tensors to be loaded by the data processing model;

for each parameter tensor of the parameter tensors to be loaded, determining whether the parameter tensor is stored in a local memory node;

in response to determining that the parameter tensor is stored in the local memory node, mapping a first parameter tensor memory in the local memory node through memory mapping and loading the parameter tensor;

in response to determining that the parameter tensor is not stored in the local memory node, determining whether the parameter tensor is allowed to be stored in a remote memory node under a current configuration combination;

in a case where the parameter tensor is allowed to be stored in the remote memory node under the current configuration combination, in response to determining that the parameter tensor is stored in the remote memory node, mapping a second parameter tensor memory in the remote memory node through memory mapping and loading the parameter tensor; and according to the processing process under the target configuration combination and the loaded parameter tensor, performing data processing on the to-be-processed data.

2. The method according to claim 1, wherein the configuration combination comprises at least one of a quantity of central processing units, a batch processing size, data parallelism, or storage locations of the parameter tensors for the operators of the data processing model, wherein the storage locations of the parameter tensors comprise the local memory node and the remote memory node.

3. The method according to claim 2, wherein before obtaining the data processing periods of the data processing model under the multiple configuration combinations, the method further comprises:

inputting the multiple configuration combinations into a preset performance estimating model, and for each of the multiple configuration combinations, determining a data processing period of each operator comprised in the data processing model under the configuration combination through the performance estimating model; and according to the data processing period of each operator under the configuration combination, determining a corresponding data processing period of the data processing model under the configuration combination.

4. The method according to claim 3, wherein the method further comprises:

in a case where the data processing model comprises at least two parallel linear networks, determining a corresponding data processing period for each of the at least two linear networks under the configuration combination; and taking a maximum value of the data processing periods for the at least two linear networks under the configuration combination as the data processing period of the data processing model under the configuration combination.

5. The method according to claim 2, wherein by taking the data processing model to be capable of processing at least the set amount of the to-be-processed data as the target, according to the target data amount for the data processing period of each of the multiple configuration combinations, selecting the target configuration combination from the multiple configuration combinations, and creating the processing process under the target configuration combination comprises:

for each target configuration combination of the multiple configuration combinations, setting storage locations of the parameter tensors in the target configuration combination as remote memory nodes; and according to an actual target data amount of the data processing model, deleting an excess processing process.

6. The method according to claim 2, wherein by taking the data processing model to be capable of processing at least the set amount of the to-be-processed data as the target, according to the target data amount for the data processing period of each of the multiple configuration combinations, selecting the target configuration combination from the multiple configuration combinations comprises:

for each of the multiple configuration combinations, in response to determining that the parameter tensors in the configuration combination are stored in the local memory node, determining the data processing period for the data processing model under the configuration combination as a first processing period;

for each of the parameter tensors in the configuration combination, determining the data processing period for the data processing model when the parameter tensor is stored in the remote memory node, as a second processing period;

according to the first processing period and the second processing period, determining an increased data processing period after changing the parameter tensor from being stored in the local memory node to being stored in the remote memory node, as a latency rise time;

according to a memory size occupied by the parameter tensor and the latency rise time for the parameter tensor, determining a greedy coefficient for the parameter tensor; and determining the parameter tensor of the parameter tensors with a highest greedy coefficient as a target parameter tensor that allows remote access;

determining the data processing period for the data processing model when the target parameter tensor is stored in the remote memory node; and determining whether the data processing period is greater than a preset service quality constraint period; and in response to determining that the data processing period is less than or equal to the preset service quality constraint period, determining the configuration combination where the target parameter tensor is stored in the remote memory node as the target configuration combination.

7. The method according to claim 6, wherein the latency rise time for the parameter tensor is negatively correlated with the greedy coefficient for the parameter tensor, and the memory size occupied by the parameter tensor is positively correlated with the greedy coefficient for the parameter tensor.

8. The method according to claim 6, wherein the method further comprises:

in response to determining that the data processing period is less than the service quality constraint period when the target parameter tensor is stored in the remote memory node, determining a next target parameter tensor and the data processing period for the data processing model when the next target parameter tensor is stored in the remote memory node, until the data processing period is greater than the service quality constraint period.

9. The method according to claim 2, wherein creating the processing process under the target configuration combination comprises:

for each processing process, according to a memory size and a CPU quantity for the processing process, filtering out server nodes that do not meet requirements of the configuration combination, and determining remaining server nodes as candidate server nodes;

for each of the candidate server nodes, determining a maximum memory that is allowed to be shared on the candidate server node; and according to the maximum memory that is allowed to be shared on each of the candidate server nodes, selecting a designated server node as a target server node, and scheduling the processing process to the target server node.

10. The method according to claim 2, wherein the method is applied to a serverless platform, and the local memory node and the remote memory node are memory nodes on a non-uniform-memory-access memory.

11. The method according to claim 1, wherein by taking the data processing model to be capable of processing at least the set amount of the to-be-processed data as the target, according to the target data amount for the data processing period of each of the multiple configuration combinations, selecting the target configuration combination from the multiple configuration combinations, and creating the processing process under the target configuration combination comprises:

according to the target data amount for the data processing period of each of the multiple configuration combinations, selecting the target configuration combination from the multiple configuration combinations, and creating the processing process under the target configuration combination;

determining whether the data processing model is capable of processing at least the set amount of the to-be-processed data after creating the processing process under the target configuration combination; and in response to determining that the data processing model is not capable of processing at least the set amount of the to-be-processed data, determining a new target configuration combination from other configuration combinations except the target configuration combination according to the target data amount for the data processing period of each of the multiple configuration combinations, and creating a new processing process under the new target configuration combination, until the data processing model is capable of processing at least the set amount of the to-be-processed data.

12. The method according to claim 1, wherein according to the processing process under the target configuration combination, performing data processing on the to-be-processed data comprises:

according to multiple target configuration combinations respectively corresponding to multiple processing processes, determining a target data amount corresponding to each of the multiple processing processes; and according to the target data amount corresponding to each of the multiple processing processes, allocating the to-be-processed data required to be processed by the multiple processing processes.

13. An electronic device comprising a memory, a processor and a computer program stored on the memory and runnable on the processor, wherein the processor, when the program is executed by the processor, achieves a method according to claim 1.

14. The method according to claim 1, wherein the method further comprises:

in response to determining that the parameter tensor is not allowed to be stored in the remote memory node under the current configuration combination, creating a memory region in a local memory and adding the parameter tensor to a local memory node corresponding to the memory region.

15. The method according to claim 1, wherein the method further comprises:

in response to determining that the parameter tensor is allowed to be stored in the remote memory node under the current configuration combination and the parameter tensor is not stored in the remote memory node, creating a memory region in a local memory and adding the parameter tensor to a local memory node corresponding to the memory region.

16. The method according to claim 1, wherein for each of the parameter tensors to be loaded, determining whether the parameter tensor is stored in the local memory node comprises:

for each of the parameter tensors to be loaded, determining a hash value for the parameter tensor; and by taking the hash value as authentication information for the parameter tensor, accessing the local memory node and determining whether the parameter tensor is stored in the local memory node.

17. The method according to claim 1, wherein according to the processing process under the target configuration combination, performing data processing on the to-be-processed data comprises:

according to the processing process comprised in the data processing model, determining mapping times for each of the parameter tensors to be loaded;

according to the mapping times for each of the parameter tensors to be loaded, determining a reference count for each of the parameter tensors to be loaded; and for each of the parameter tensors to be loaded, in response to determining that the reference count for the parameter tensor is reset during the data processing of the to-be-processed data, reclaiming a tensor memory for the parameter tensor.

18. A computer readable storage medium, wherein the storage medium stores a computer program, and the computer program, when executed by a processor, achieves a method according to claim 1.

19. A method for data processing, comprising:

obtaining to-be-processed data;

determining whether a data processing model is capable of processing at least a set amount of the to-be-processed data under a current processing process, in response to determining that the data processing model is not capable of processing at least the set amount of the to-be-processed data under the current processing process, obtaining data processing periods of the data processing model under multiple configuration combinations;

for a data processing period of each of the multiple configuration combinations, determining an amount of data that is capable of being processed by the data processing model within the data processing period, as a target data amount;

by taking the data processing model to be capable of processing at least the set amount of the to-be-processed data as a target, according to the target data amount for the data processing period of each of the multiple configuration combinations, selecting a target configuration combination from the multiple configuration combinations, and creating a processing process under the target configuration combination; and according to the processing process under the target configuration combination, performing data processing on the to-be-processed data, wherein the configuration combination comprises at least one of a quantity of central processing units, a batch processing size, data parallelism, or storage locations of the parameter tensors for the operators of the data processing model, wherein the storage locations of the parameter tensors comprise the local memory node and the remote memory node, and wherein by taking the data processing model to be capable of processing at least the set amount of the to-be-processed data as the target, according to the target data amount for the data processing period of each of the multiple configuration combinations, selecting the target configuration combination from the multiple configuration combinations comprises:

for each of the multiple configuration combinations, in response to determining that the parameter tensors in the configuration combination are stored in the local memory node, determining the data processing period for the data processing model under the configuration combination as a first processing period;

for each parameter tensor of the parameter tensors in the configuration combination, determining the data processing period for the data processing model when the parameter tensor is stored in the remote memory node, as a second processing period;

according to the first processing period and the second processing period, determining an increased data processing period after changing the parameter tensor from being stored in the local memory node to being stored in the remote memory node, as a latency rise time;

according to a memory size occupied by the parameter tensor and the latency rise time for the parameter tensor, determining a greedy coefficient for the parameter tensor; and determining the parameter tensor of the parameter tensors with a highest greedy coefficient as a target parameter tensor that allows remote access;

determining the data processing period for the data processing model when the target parameter tensor is stored in the remote memory node; and determining whether the data processing period is greater than a preset service quality constraint period; and in response to determining that the data processing period is less than or equal to the preset service quality constraint period, determining the configuration combination where the target parameter tensor is stored in the remote memory node as the target configuration combination.

20. A computer readable storage medium, wherein the storage medium stores a computer program, and the computer program when executed by a processor achieves a method according to claim 19.

* * * * *